United States Patent
Gomez et al.

(10) Patent No.: US 8,156,537 B2
(45) Date of Patent: Apr. 10, 2012

(54) METHOD AND SYSTEM FOR ACCESS CONTROL USING RESOURCE FILTERS

(75) Inventors: Laurent Gomez, Le Cannet (FR); Annett Laube, Valbonne (FR)

(73) Assignee: SAP AG, Walldorf (DE)

( * ) Notice: Subject to any disclaimer, the term of this patent is extended or adjusted under 35 U.S.C. 154(b) by 715 days.

(21) Appl. No.: 11/948,150

(22) Filed: Nov. 30, 2007

(65) Prior Publication Data

US 2008/0263625 A1 Oct. 23, 2008

(30) Foreign Application Priority Data

Nov. 30, 2006 (EP) .................................... 06291847

(51) Int. Cl.
*H04L 9/00* (2006.01)
*H04L 9/32* (2006.01)
(52) U.S. Cl. .................................... 726/1; 726/2; 726/4
(58) Field of Classification Search ................... 726/1–7, 726/11, 14, 22, 26–30; 713/166–168, 189, 713/193
See application file for complete search history.

(56) References Cited

U.S. PATENT DOCUMENTS

| | | | |
|---|---|---|---|
| 6,138,238 A * | 10/2000 | Scheifler et al. ................. | 726/17 |
| 6,668,322 B1 | 12/2003 | Wood et al. | |
| 2004/0128547 A1 | 7/2004 | Laidlaw et al. | |
| 2004/0215956 A1 | 10/2004 | Venkatachary et al. | |
| 2004/0268142 A1 | 12/2004 | Karjala et al. | |
| 2005/0065950 A1* | 3/2005 | Chaganti et al. .............. | 707/100 |
| 2006/0046691 A1 | 3/2006 | Nishio | |
| 2008/0066175 A1 | 3/2008 | Dillaway et al. | |
| 2008/0141339 A1 | 6/2008 | Gomez et al. | |

FOREIGN PATENT DOCUMENTS

| | | |
|---|---|---|
| WO | 0000879 | 1/2000 |
| WO | WO0079434 A | 12/2000 |
| WO | 2005125077 A1 | 12/2005 |

OTHER PUBLICATIONS

Yao, Han-Bing, et al. "Dynamic Role and Context-Based Access Control for Grid Applications", TENCON 2005, IEEE Region 10, pp. 1-7, (Nov. 2005).
Bhatti, Rafae, et al. "Access Control in Dynamic XML-based Web-Services with X_RBAC", http://www.sis.pitt.edu/~jjoshi/ICWS_XRBAC_Final_PDF.pdf, (2003).

(Continued)

*Primary Examiner* — Hosuk Song
(74) *Attorney, Agent, or Firm* — Brake Hughes Bellermann LLP (57) ABSTRACT

The present description refers in particular to a method, a system, and a computer program product for access control using resource filters for a strict separation of application and security logic. The computer-implemented method for access control may include receiving at least one access request to at least one resource from an application; providing a resource hierarchy for the at least one resource, the resource having at least one resource class, wherein the resource hierarchy is defined in a single resource; providing a policy comprising at least one access control rule for accessing at least one element of the at least one resource class; verifying the at least one access request based on the policy through an authorization service; and processing the at least one access request through a service interface.

20 Claims, 8 Drawing Sheets

OTHER PUBLICATIONS

Oasis (IBM, Sun, BEA, Entrust et al). eXtensible Access Control Markup Language (XACML). Version 1.1. Committee Specification, http://www.oasis-open.org/committees/xacml/repository/cs-xacml-specification-1.1.pdf (Aug. 7, 2003).

"Securing SOAP Messages with WSS4J", http://ws.apache.org/axis2/modules/rampart/1_0/security-module.html (Jun. 20, 2006).

Carr, Harold "Sun's Project Tango" http://web.archive.org/web/20061124051012/http://java.sun.com/developer/technicalArticles/glassfish/ProjectTango/?feed=JSC (Jun. 2006).

Hendrik, R. "An Introduction to Web Service Security using WSE—Part I", http://web.archive.org/web/20050206002831/www.codeproject.com/webservices/WS-Security.asp (May 17, 2004).

Minami, Kazuhiro "Secure Context-sensitive Authorization", Dartmouth Technical Report TR2006-571, http://www.ists.dartmouth.edu/library/180.pdf (Feb. 2006).

Damianou, Nicodemos, et al. "Ponder: A Language for Specifying Security and Management Policies for Distributed Systems", The Language Specification, Version 1.11, Imperial College Research Report DoC 2000/01, http://www.doc.ic.ac.uk/research/technicalreports/2000/DTR00-1.pdf (Jan. 18, 2000).

Welch, Von, et al. "OGSI Authorization Requirements: Status of This Memo", http://www.ggf.org/documents/GFD.67.pdf (Mar. 26, 2006).

Ilechko, Paul, et al. "Authorization concepts and solutions for J2EE applications", http://www-128.ibm.com/developerworks/websphere/library/techarticles/0607_ilechko/0607_ilechko.html (Jul. 19, 2006).

Abstract of Article, Karjoth, Gunter "Access control with IBM Tivoli access manager", ACM Transactions on Information and System Security (TISSEC), vol. 6, Issue 2, pp. 232-257, http://portal.acm.org/citation.cfm?id=762476.762479 (May 2003).

Extended European Search Report for Application No. 06 29 1847 dated Jul. 27, 2007.

Office Action for EP Application No. 06291847.9, mailed Jul. 16, 2009, 10 pages.

"Technical Standard, Authorization (AZN) API", The Open Group, UK, Jan. 2000, 124 pages.

Office Action Response for EP Application No. 06291847.9, filed Dec. 12, 2008, 13 pages.

Office Action for EP Application No. 06291847.9, mailed Oct. 31, 2008, 3 pages.

Response to Summons to Attend Oral Proceedings for EP Application No. 06291847.9, filed May 11, 2009, 9 pages.

Summons to Attend Oral Proceedings for EP Application No. 06291847.9, mailed Mar. 6, 2009, 5 pages.

Office Action for U.S. Appl. No. 11/903,257, mailed Sep. 1, 2010, 11 pages.

Office Action for U.S. Appl. No. 11/903,257, mailed Feb. 3, 2011, 13 pages.

Office Action Response for U.S. Appl. No. 11/903,257, filed Nov. 23, 2010, 11 pages.

Extended European Search Report for EP Application No. 06291907.1, mailed May 18, 2007, 6 pages.

Non-Final Office Action for U.S. Appl. No. 11/903,257, mailed May 27, 2011, 26 pages.

* cited by examiner

METHOD AND SYSTEM FOR ACCESS CONTROL USING RESOURCE FILTERS

CROSS-REFERENCE TO RELATED APPLICATION

This application claims priority under 35 U.S.C. §119 to European Patent Application EP06291847.9, filed Nov. 30, 2006, titled "Method and System for Access Control Using Resource Filters," which is incorporated herein by reference in its entirety.

TECHNICAL FIELD

This description relates to access control in distributed architectures.

BACKGROUND

Service-oriented architecture (SOA) is a rapidly growing design option expressing a perspective of software architecture that defines the use of loosely coupled (service) applications. This poses unique challenges on securing and governing data exchange. One of the most challenging parts is to provide means for reliable and secure access control to SOA services.

SOA services often return complex data objects to a requester. Hence, security requirements might request abilities of access control to a finer level of granularity than a service itself.

Ubiquitous computing environments of wireless connectivity and widespread diffusion of portable devices offer novel opportunities for users to share resources anywhere and at any time and to form ad-hoc coalitions. In such an environment, context-awareness emerges as a crucial aspect for access control.

SUMMARY

According to one general aspect, a method for access control may include receiving at least one access request to at least one resource from an application; providing a resource hierarchy for the at least one resource, the resource having at least one resource class; providing a policy comprising at least one access control rule for accessing at least one element of the at least one resource class; verifying the at least one access request based on the policy through an authorization service; and processing the at least one access request through a service interface.

According to another aspect, the resource hierarchy may be defined in a single resource.

According to yet another aspect, a system may include an application configured to send at least one access request to at least one resource; a resource hierarchy for the at least one resource, the resource having at least one resource class, wherein said resource hierarchy is defined in a single resource; a policy comprising at least one access control rule configured to access at least one element of the at least one resource class; an authorization service configured to verify the access request based on the policy; and a service interface configured to process the at least one access request.

In another general aspect, there is provided a computer-program product comprising code, which when loaded in and run by a computer system and/or computer network system, causes the computer system and/or computer network system to perform operations according to any of the above techniques.

In yet another general aspect, a computer program product for handling transaction information may be tangibly embodied on a computer-readable medium and may include executable code that, when executed, is configured to cause a data processing apparatus to receive at least one access request to at least one resource from an application; provide a resource hierarchy for the at least one resource, the resource having at least one resource class, wherein said resource hierarchy is defined in a single resource; provide a policy comprising at least one access control rule for accessing at least one element of the at least one resource class; verify the at least one access request based on the policy through an authorization service; and process the at least one access request through a service interface.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
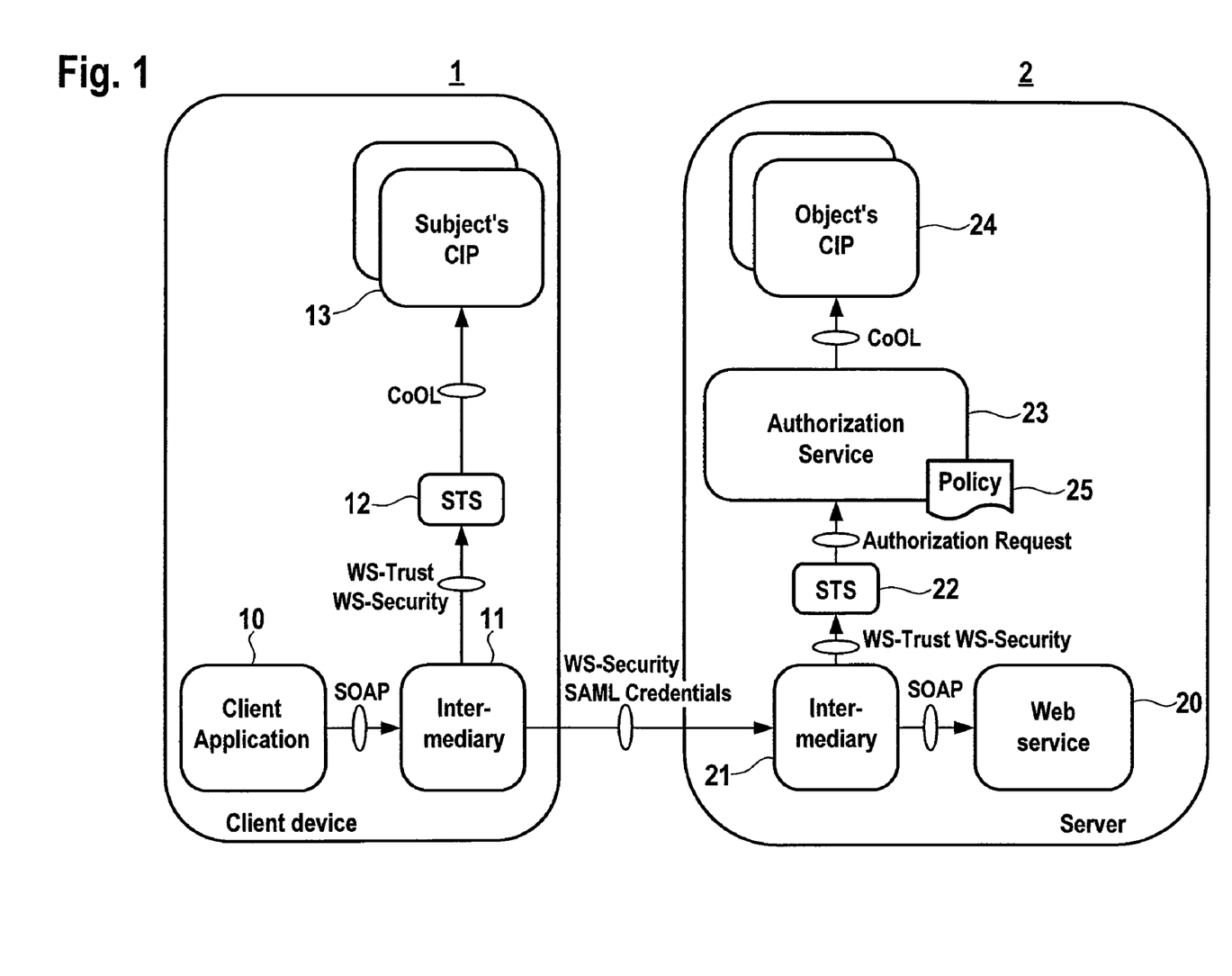
FIG. 1 is a block diagram of a system of a service-oriented architecture according to an example embodiment.

The architecture shown in FIG. 1 comprises a client 1 and a server 2. On the server 2 a service interface 20, for example a Web service, is implemented which provides an interface to access data and/or data objects of one or more resources (not shown). On the client 1, an application 10, for example an end user or another service (e.g. another Web service), acts as a service client which may request the service interface 20 for some service on at least one of the one or more resources. The service interface 20, which can be called from the application 10 in a standard way through its interface, is independent from the application 10, i.e. the service 20 has no pre-knowledge of the calling application 10 and the application 10 neither having nor needing knowledge of how the service 20 actually performs its incoming tasks and requests.

It should be understood that according to the architecture shown in FIG. 1, one or more services acting both as service interface 20 and as client application 10 may be implemented on various distributed platforms and may be accessed across networks. Hence, reuse of services may be enhanced.

In one example, an application 10, a service 20, and at least one resource, which may be accessed through the service 20, are linked on demand to achieve a desired result such as responding to a request to be performed on the at least one resource send from the application 10 to the service 20.

The one or more resources may be specified in a resource hierarchy (not shown) in a single resource comprising one or more resource classes for the one or more resources depending on a selected level of granularity. The resource hierarchy may be defined using a tree structure wherein a child resource class inherits data elements from its parent resource class and may add further data elements. Furthermore, the resource hierarchy may keep interrelationships and/or dependencies among the one or more resources. The resource hierarchy may represent any level of granularity necessary for the service 20 and/or the application 10. The resource hierarchy may be provided both outside the application 10 and outside the service interface 20. In this way, the application 10 and the service interface 20 remain unchanged even if the resource hierarchy changes, for example in its granularity. Hence, the resource hierarchy may be easily adapted to new requirements without interfering the service 10 and/or the application 20.

A policy 25 may be defined for the resource hierarchy as a whole rather than for each of the one or more resources, which are included in the resource hierarchy. The policy 25 may also be defined outside the service 20 and/or the application 10. According to an example embodiment, the resource hierarchy and the policy 25 may be provided with an authorization service 23 located on the server 1 separate from the service interface 20. Having the resource hierarchy and the policy 25 provided with the authorization service 23, the service 20 (as well as the application 10) is independent from the policy 25 as well as from the resource hierarchy, which ensures a separation of the service 20 and the application 10 from access control. Hence, business logic and security logic are separated.

Figure 2:
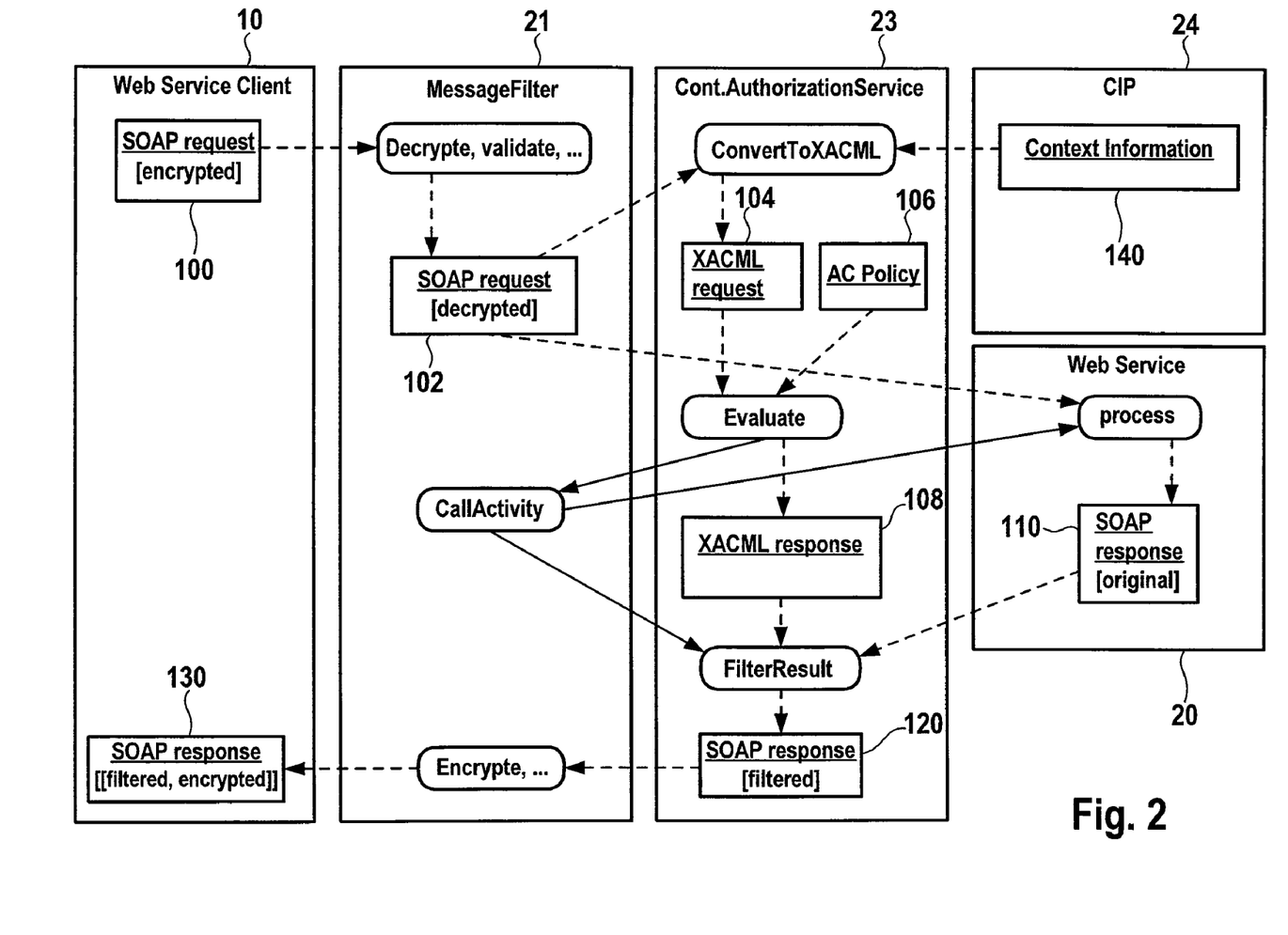
FIG. 2 depicts an activity diagram of a request to a service according to an example embodiment.

According to FIGS. 1 and 2, a request message 100, sent from the application 10 to the service interface 20 may pass a client-side intermediary 11 and a server-side intermediary 21. Similarly, a response message 110 corresponding to the request message 100, sent from the service interface 20 to the application 10, may pass the server-side intermediary 21 and the client-side intermediary 11. In one example, the request message 100 and the response message 110 may include eXtensible Markup Language (XML)-based messages exchanged using SOAP (Simple Object Access Protocol). The client-side intermediary 11 and the server-side intermediary 21 may enforce at least one security policy 25, which may be evaluated against the request message 100 by an authorization service 23.

The intermediaries 11 and 21 may include a pipeline of message filters, also referred to as proxies. In general, the intermediaries 11 and 21 may be able to accept and forward messages 100 and 110 and perform a form of message processing as well. The intermediaries 11 and 21 may be further able to cross trusted domains. In particular, the intermediaries 11 and 21 may decide on whether a message request 100 from the application 10 may cross a trust domain boundary on the server 2 or whether access is denied. Hence, the request message 100 and a corresponding response message 110 exchanged between the application 10 and the service interface 20 may be secured by passing them through the intermediaries 11 and 21. Accordingly, the client-side intermediary 11 may add encryption, integrity checks, and credentials to the request message 100. According to an example embodiment, the client-side intermediary 11 may first encrypt and subsequently sign the request message 100. The server-side intermediary 21 may decrypt, verify integrity, and verify authorization in credentials of the request message 100 in order to obtain a decrypted request 102, which has been verified. According to an example embodiment, the server-side intermediary may check a digital signature, and, if the signature is valid, may decrypt the request 100. The server-side intermediary 21 may offer an interface similar to that of the service interface 20 plugged behind the server-side intermediary 21. Therefore, the server-side intermediary 21 may be invisible to the outside, in particular to the application 10.

The client 1 may further include a client-side Security Service Token (STS) 12 communicating on the one hand side with the client-side intermediary 11 and on the other hand side with a client-side information provider 13. According to an example embodiment, the client-side intermediary 11 may request context information for the client application 10 from the client-side STS 12, when receiving a request 100 from the application 10. In response, the client-side STS 12 may generate signed context information retrieved from the client-side information provider and may add a role information and/or one or more attributes to the request message 100 for the requesting application 10. The role information and/or the one or more attributes may include some characteristic of the application 10 (e.g., a person's role) in addition to information when and how the application 10 was authenticated. A credential for the application may include the one or more attributes. The credential may be added to the request message 100. According to an example embodiment, a credential may include an issuer, a signature, a subject, one or more conditions, and an authentication statement according to the one or more attributes retrieved for the application 10.

Accordingly, in order to authenticate at a remote service interface 20, the application 10 may authenticate itself to its information provider 13 via the client-side STS 12, which is in charge of authenticating the application 10 and keeping track of other information about the application 10, and based on this authentication, the application 10 may then be able to access at least one of the one or more resources in the resource hierarchy provided through the service interface 20.

When the server-side intermediary 21 receives the encrypted request message 100 from the client application 10 through the client-side intermediary 11, the server-side intermediary 21 may decrypt the incoming request message 100 by extracting an encrypted session key from the request message 100 and may decrypt it with its private key. In this way, the client-side intermediary 21 may verify that the request 100 is signed by the holder (e.g., application 10) of a credential sent with the request message 100. The session key may subsequently be used to encrypt the request message 100. The credential and a target may be provided to a server-side STS 22 through a validation interface. The target may include a set of conditions for the application 10, at least one resource, which may be accessed from the application 10 and at least one action to be performed on the resource. The server-side STS 22, in turn, may provide the credential to the authorization service 23. According to an example embodiment, the authorization service 23 is in charge to verify the request message 100. According to an example embodiment, the authorization service 23 may authorize or deny the access request based on the target, the credential, the content of the request message 100, and at least one policy 25. Depending on the policy 25, needed context information may be retrieved from a server-side information provider 24.

According to FIG. 2, an example access request 100 from the application 10 is shown in an activity diagram.

Accordingly, the server-side intermediary 21 may receive the encrypted request message 100 from the client application 10. The server-side intermediary 21 may verify that the request 100 is signed by the client application 10. The authorization service 23 may receive the credential of the request 100 as well as the target from the server-side intermediary 21 through the server-side STS 22. In a first operation, the authorization service 23 may convert the received request message 102, which has been previously decrypted by the server-side intermediary 21, into a request 104 which may be enforced by a policy 106, which may be applied to a resource hierarchy, which may define in a single resource interrelationships among one or more resources that may be accessed through the service interface 20. In a subsequent operation, a policy 106 may be searched, whose target meets all conditions of the attributes of the request 104. According to an example embodiment, a target may include a set of simplified conditions for a subject, a resource hierarchy, and an action to be performed on at least one resource of the resource hierarchy that must be met for a policy 106 to apply to the request 104. If all the conditions of the target are met by the application 104, then the policy 106 may apply to the request 104.

According to an example embodiment, the decrypted request message 102 may be an XML-based request exchanged using SOAP and the converted request 104 and the policy 106 may be expressed in XACML (eXtensible Access Control Markup Language). Conversions made be performed using XSLT (eXtensible Stylesheet Language (XSL) Transformations).

According to an example embodiment, the authorization service 23 may find, verify, and evaluate the converted request 104 against the policy 106 as follows: The request 104 from the application 10 may include one or more attributes corresponding to the application 10 and a requested resource. The attributes may have been added to the request message 100 through the client-side intermediary 11 by receiving context information from the client-side information provider 13 such as role information. Only if the policy 106 has a target matching to the one or more attributes in the request 104, the request 104 may be evaluated to make an authorization decision and to return a response 108 to the request 104 in view of the policy 106. The policy 106 may include any number of rules. According to an example embodiment, the key concept of a rule is a condition. If the condition of the rule evaluates to true, then the rule's effect, which is a value of "Permit" or "Deny" that is associated with successful evaluation of the rule, may be returned. Evaluation of a condition may also result in an error ("Indeterminate") or discovery that the condition does not apply to the request 104 ("NotApplicable"). The authorization decision, which is send to the application 10, may either include a granting decision, i.e., a permission to access to the target resource or a rejection denying access to the target resource.

In case the policy 106 needs context information 140, the authorization service 23 retrieves the required context information 140 a server-side information provider 24. Then the authorization service 23 may convert the received context information 140 into the language used to express the policy 106 (e.g., XACML). During evaluation of the request 104 against the policy 106, the policy 106 may be enforced with the context information 140.

The granting decision (the rejection, respectively) may be sent back from the authorization service 23 to the server-side STS 22. In case decision is granted, the original and already decrypted request message 102 from the application 10 may be passed to the service interface 20 and processed therein. In case decision is rejected, an error may be sent to the application 10.

A response message 110 from the service interface 20 to the request message 102, which may be generated after the request message 102 has been processed by the service 20, in turn, may pass the server-side intermediary 23. A response filter provided by the authorization service 23 may apply the response 108, which has been generated during evaluation of the request 104 against the policy 106, to the response message 110 from the service interface 20. During this process, all not permitted resources may be evaluated and the response message 110 may be modified accordingly in order to obtain a filtered response message 120. Modification may be performed in two different ways: If an access to an optional node of the response message 110 is denied, the corresponding part may be removed from the response message 110. In case a mandatory node of the response message 110 is denied, corresponding parts may be blanked out. The filtered response message 120 is compliant to the policy 106. Subsequently, additional filters (not shown) may be applied to the filtered response 120 when passed through the server-side intermediary 21 in order to encrypt and add credentials to the filtered response 120, such that the application 10 receives a filtered and encrypted response 130, which may be, in turn, verified and decrypted when passed through the client-side intermediary 11.

According to an example embodiment, XACML may be used for describing requests and response as well as policies, wherein the authorization service 23 may include a Policy Enforcement Point (PEP), a Policy Decision Point (PDP), a Policy Information Point (PIP), and a Policy Administration Point (PAP). Accordingly, the PEP receives the request 104 enforces the authorization decision by the PDP.

Figure 3:
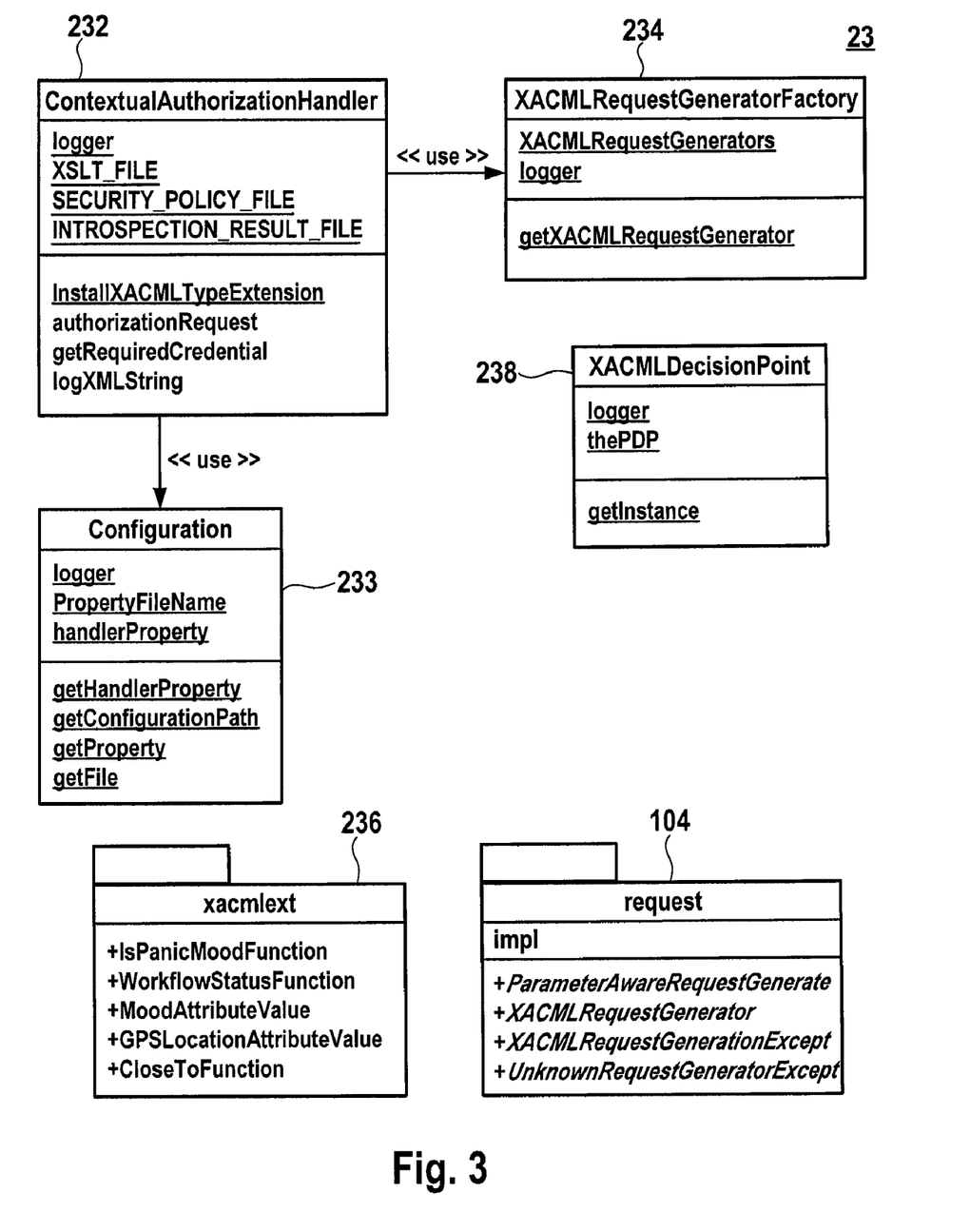
FIG. 3 depicts a class diagram of an implementation of access control according to an example embodiment.
Figure 4:
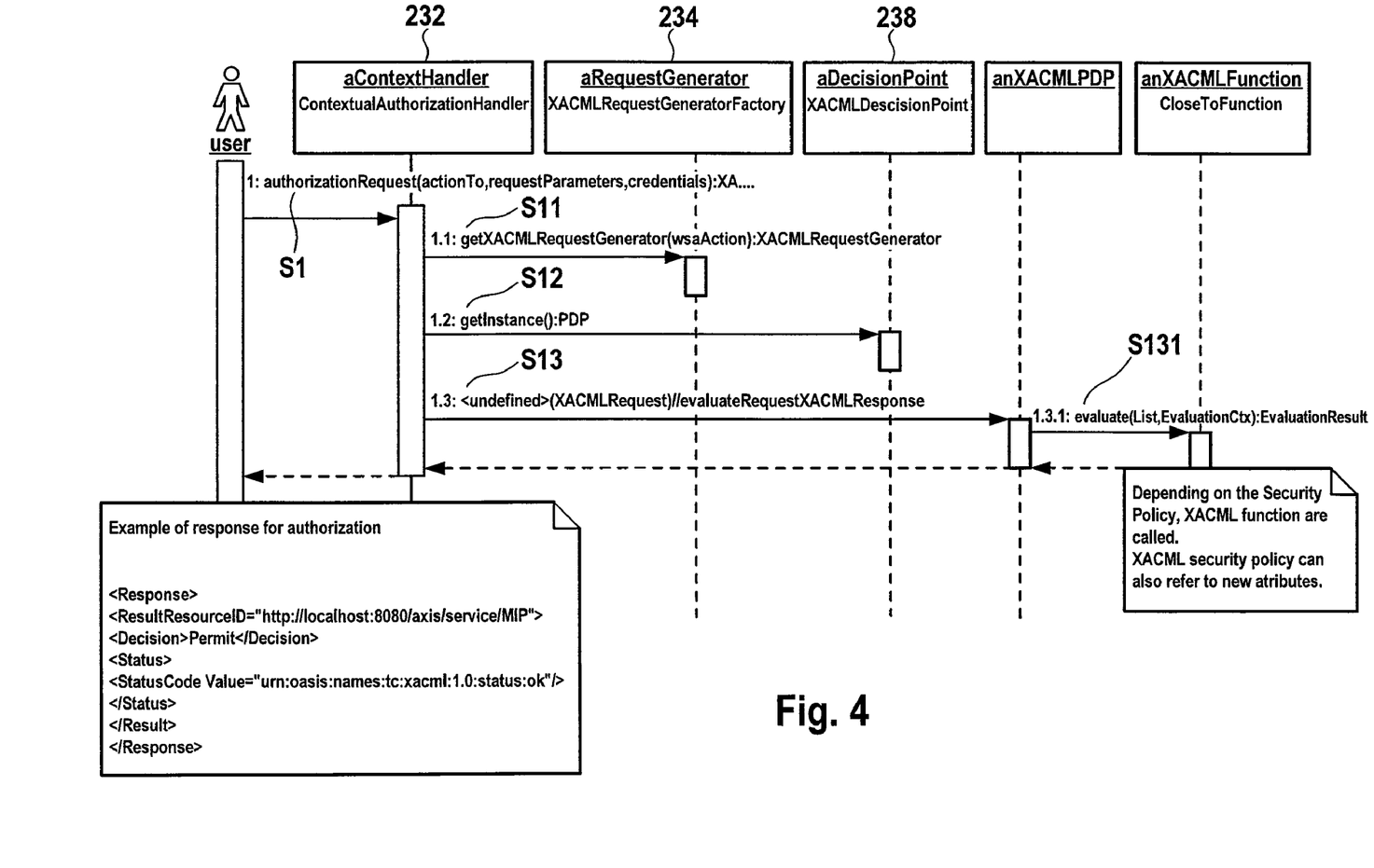
FIG. 4 depicts a sequence diagram of an implementation of access control according to an example embodiment.

According to FIGS. 3 and 4, an example implementation of access control using resource filters is shown.

The main components of the authorization service 23 may include a handler class 232 such as ContextualAuthorizationHandler, a generator class 234 such as XACMLRequestGeneratorFactory, and a supplemental request/response and policy language package 236 such as Xacmlext, which supplements XACML. The handler 232 may receive any incoming request message (S1). To convert an incoming request message into XACML, it may use the generator class 234 by calling a get method (S11) such as getXACMLRequestGenerator of the generator class 234. According to an example embodiment, a corresponding XACML request corresponding to the request message may be generated. In the package 236, additional attributes that offer a higher level of abstraction for data representation and functions for manipulating the additional attributes, complementing an existing implementation of a request/response and policy language such as XACML may be defined. These additional attributes and functions may be used together with those predefined with the language (e.g., XACML) used in order to define at least one policy for at least one resource hierarchy for one or more resources. A resource hierarchy may be defined by a tree structure reflecting one or more relationships and/or dependencies among the one or more resources.

In a policy, access control to all nodes of a resource hierarchy may be described, according to an example embodiment. In this way, a single access control rule (also referred to as a single policy constraint) may be applied to an entire sub-tree of the resource hierarchy, rather than having a separate access control rule for each node. This may enhance ease of use of the policy as well as the likelihood that the policy will reflect desired access control. Access to one node of the resource hierarchy often depends on a value for a father node and access control may add further restrictions to a lower level in the resource hierarchy. According to an example embodiment, an access control rule for a data element of a lower-level resource class in the resource hierarchy may be defined and another access control rule for a data element shared by a resource class and at least one further resource class on a lower level of the resource hierarchy which is related to the resource class may be defined in one policy for the resource hierarchy. Accordingly, a single policy may be defined for a set of resources defined through different resource classes in the resource hierarchy. Hence, a set of resources may be uniquely accessed from one or more applications 10 using the resource hierarchy provided by a service interface 20.

In FIG. 4, an example process of response for authorization for access to at least one resource of the resource hierarchy according to the example implementation of FIG. 3 is shown. Accordingly, both role-based access control (RBAC) and context-aware access control may be supported. Policy enforcement of a request from an application 10 against a policy 25 performed by the authorization service 23 may rely on verifying attributes related to the application 10, a resource, one or more actions to be performed in the resource as well as an environment. An incoming request from the application 10 may be passed through the server-side intermediary 21 wherein the server-side STS 22 may call a request method such as authorizationRequest (S1) of the authorization service 23, provided by the handler 232 of the authorization service 23. The request method may include one or more parameters such as actionTo, requestParameters, and credentials. According to an example embodiment, a first parameter (e.g., actionTo) may include a description of the resource and actions to be performed on the resource; a second parameter (e.g., requestParameters) may include the request sent from the application 10 to the service interface 20; and a third parameter (e.g. credentials) may include all credentials attached to the request message from the application. Based on the description of the resource and actions to be performed on the resource, the handler 232 may retrieve an associated generator 234 and a policy, which may be applied to the request. If context information is needed, the context information may be retrieved from the server-side information provider 24. The context information needed to enforce the policy may be evaluated out of the policy itself. The generator 234 may convert the request message and the credentials attached to the request message into an XACML request using XSLT and may add, if necessary, the context information. The generated XACML request (S12) may be evaluated by the PDP (S13, S131). Before evaluation starts, a resource finder may be used to determine a set of nodes from the resource hierarchy in accordance with the target resource specified by the request message 100. Evaluation may be based on both information about the resource and context information or information on the application 10 from the request message 100 sent. As shown in an example aspect in Table I shown below, a response from a decision point 238 such as PDP may include a separate result for each resource included in a resource hierarchy:

TABLE I

```
<Response>
  <Result ResourceID="http://localhost/MedicalData/personal">
    <Decision>Permit</Decision>
    <Status>
      <StatusCode
```

TABLE I-continued

```
      Value="urn:oasis:names:tc:xacml:1.0:status:ok">
    </Status>
  </Result>
  <Result ResourceID="http://localhost/MedicalData">
    <Decision>Permit</Decision>
    <Status>
      <StatusCode
      Value="urn:oasis:names:tc:xacml:1.0:status:ok"/>
    </Status>
  </Result>
  <Result ResourceID="http://localhost/MedicalData/insurance">
    <Decision>Deny</Decision>
    <Status>
      <StatusCode
      Value="urn:oasis:names:tc:xacml:1.0:status:ok"/>
    </Status>
  </Result>
</Response>
```

According to an example embodiment, a method for access control may include receiving at least one access request to at least one resource from an application; providing a resource hierarchy for the at least one resource, the resource having at least one resource class; providing a policy comprising at least one access control rule for accessing at least one element of the at least one resource class; verifying the at least one access request based on the policy through an authorization service; and processing the at least one access request through a service interface.

By providing a resource hierarchy, resources may be described and implemented independent and outside from an application as well as from a service interface providing an interface for access the resources. Furthermore, the application and/or the service interface may be kept unchanged in case the resource hierarchy changes. Hence, the resource hierarchy may be easily adapted to new requirements without interfering with the application and/or the service interface itself. Additionally, the resource hierarchy may reflect inter-relationships and/or dependencies among various resources defined in the resource hierarchy that may be accessed through the service interface. The resource hierarchy may be provided by the service interface through an abstract resource class of master data common to each resource of a set of resources comprised in the resource hierarchy, which may be accessed by different applications.

Accordingly, a resource hierarchy may be a (structured) assembly of one or more resources in a single resource, which explicitly specifies one or more relationships and/or dependencies among the one or more resources explicit. Furthermore, the one or more resources may be represented by an abstract resource class (i.e., an abstract specification common to each of the one or more resources) of common master data (i.e., data of one or more data types common to each of the one or more resources). For example, a resource hierarchy including one or more resources of vehicles such as automobiles, buses, and trucks may be represented through an abstract resource class for vehicles including common master data such as a wheel, an engine, and at least for wheels.

By providing a policy comprising one or more access control rules applicable to any level of granularity of the resource hierarchy, e.g., an access control rule may be applied to one specific element of one resource class included in the resource hierarchy, arbitrarily fine grained access to any class of the resource hierarchy can be achieved. According to an example embodiment, a resource class of the resource hierarchy may represent a resource (e.g., an object, a data table). The resource class, in turn, may include one or more elements which may refer to data entries of one or more data types and/or one or more operations and/or functions to manipulate such data entries.

Accordingly, a resource class may specify a resource and/or an object including at least one set of data of a data type and/or at least one method to manipulate the data, which describe the object. For example, a resource class may implement a customer object including data of data types "customer name" and "customer address" of at least one customer and a method to retrieve a customer name of the at least one customer.

As used herein, access control may refer to a practice of restricting entrance to an object and/or a resource such as a file system, a database system, or a process, i.e., an ability to permit or deny request, use, and/or manipulation of an object and/or a resource to authorized and unauthorized requesters, respectively. Accordingly, an access control rule may substantially include a condition, which must be fulfilled by a subject or an identity such as a requester in view of a requested object and/or resource. According to an example embodiment, a condition may include a Boolean function, which may evaluate to true or false. According to an example embodiment, a policy may represent a single access control policy, expressed through a set of one or more access control rules.

In verifying the access request based on the policy, the access request may be enforced by the policy in order to be properly processed through the service interface, according to an example embodiment.

In case an authorization service has permitted the access request, i.e., in case the verification process has succeeded, the request may be processed through the service interface in accordance with the policy.

According to an example embodiment, the resource hierarchy may be provided outside the application and/or outside the service interface. Furthermore, the policy may be provided outside the service interface and/or outside the application.

Accordingly, the resource hierarchy and the policy may be provided within the authorization service being separately provided from both the application and the service interface. The authorization service may be further provided in a server as well as the service interface wherein the application may be provided in a client. The server and the client may communicate through client-side and server-side intermediaries. Client-side and server-side intermediaries may be used to add decryption, encryption, and credentials to the access request.

According to an example embodiment, the resource hierarchy may be defined in a single resource.

Accordingly, the resource hierarchy is not a bundle of several single resources, according to an example embodiment. Rather, the resource hierarchy may provide a unified interface to a set of resources representing relationships and/or dependencies among one or more resources of the set of resources, which may be accessed by one or more applications. Furthermore, by providing a resource hierarchy in a single resource for a set of resources, a single policy may be defined for the set of resources with a desired level of granularity. According to an example embodiment, an access control rule may be applied to an element of a resource class which may be included in the resource hierarchy and another access control rule may be applied to an element shared by a set of related resource classes included in the resource hierarchy. This is contrary to define to each of the single resources single policies, respectively.

According to an example embodiment, the resource hierarchy may keep at least one relationship between the at least one resource class and at least one further resource class.

According to an example embodiment, an abstract resource class may provide an abstraction of the at least one resource and wherein the at least one resource may further offer at least one projection of the abstract resource class.

Accordingly, the at least one resource class providing an abstraction of the at least one further resource class may be exposed via the service interface and may be used by the application. In this way, the abstract resource class may offer an interface for uniform and/or identical manipulation of the at least one further resource class in the resource hierarchy accessed by one or more applications.

According to an example embodiment, the method may further include receiving first context information from a first information provider; and adding said first context information to the at least one access request.

Accordingly, the access request may be enhanced with context information concerning a requester having sent a request as well as a role information and/or one or more attributes for the requester.

According to an example embodiment, the method may further include retrieving second context information from a second information provider depending on the policy, wherein verifying the access request may further include enforcing the policy with the second context information.

In retrieving second context information depending on the policy, the policy may be enforced with such context information when verifying a request in order to permit access to the resource. Hence, according to an example embodiment, context-aware access control may be supported.

According to an example embodiment, the method may further include sending at least one response for the at least one access request to the application, wherein sending at least one response to the application may further comprise applying a response filter to the at least one response.

According to an example embodiment, the policy may include an XACML policy.

According to an example embodiment, there is provided a computer-program product comprising code, which when loaded in and run by a computer system and/or computer network system, causes the computer system and/or computer network system to perform operations according to any one of the above methods.

According to an example embodiment, a system for access control may include an application for sending at least one access request to at least one of a plurality of resource providers; a resource hierarchy for the at least one resource, the resource having at least one resource class; a policy comprising at least one access control rule for accessing at least one element of at least one resource class; an authorization service for verifying the access request based on the policy; and a service interface for processing the at least one access request.

According to an example embodiment, the system is further operable to perform operations according to any one of the above methods.

Figure 5:
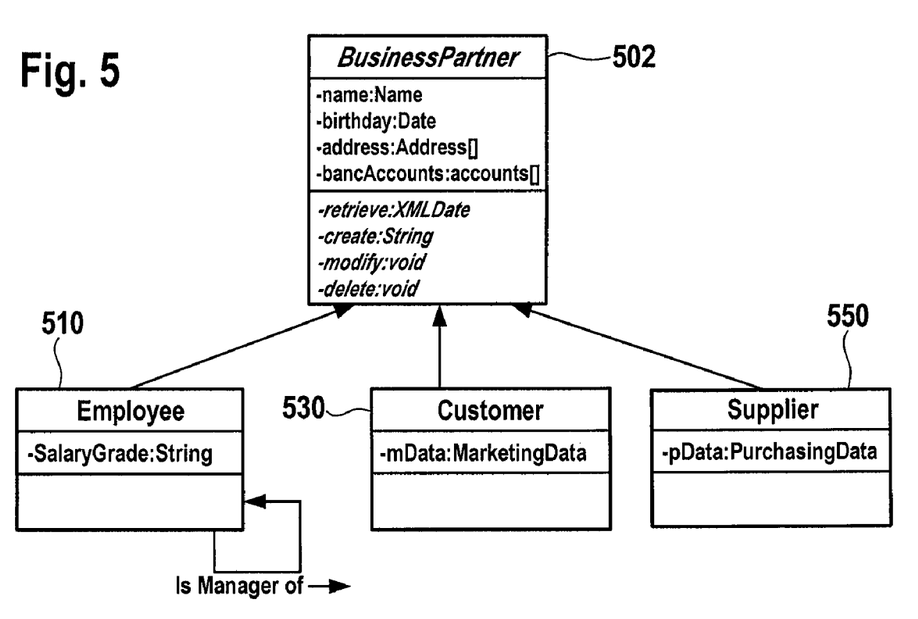
FIG. 5 depicts a first example using role-based access control.
Figure 5A:
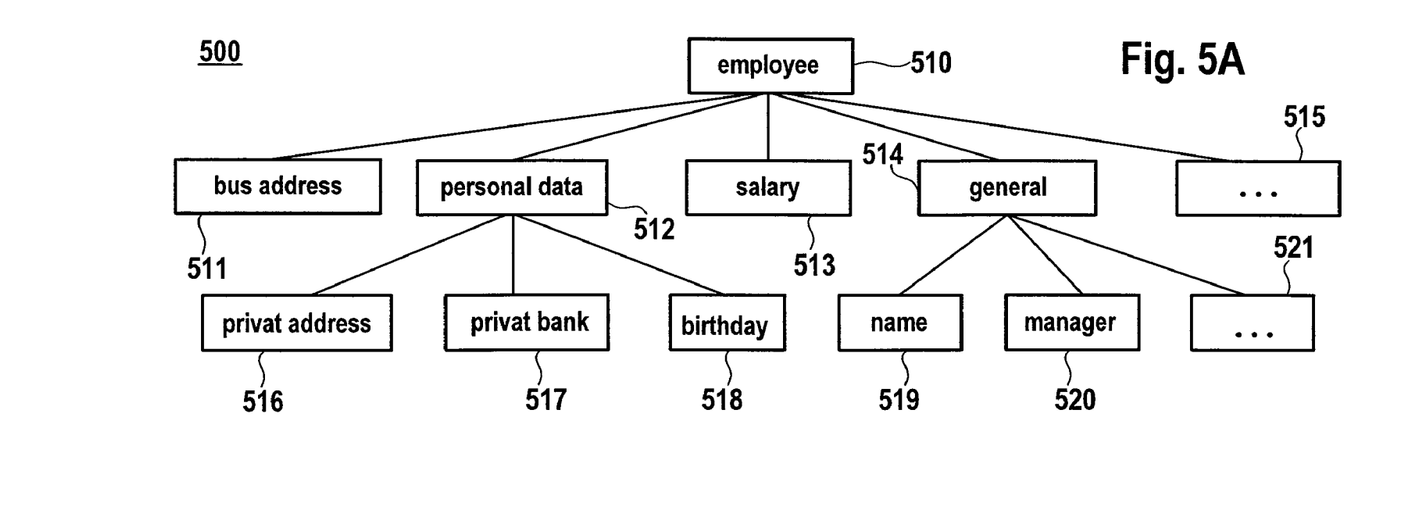
FIG. 5A depicts a resource hierarchy according to an example embodiment.
Figure 6:
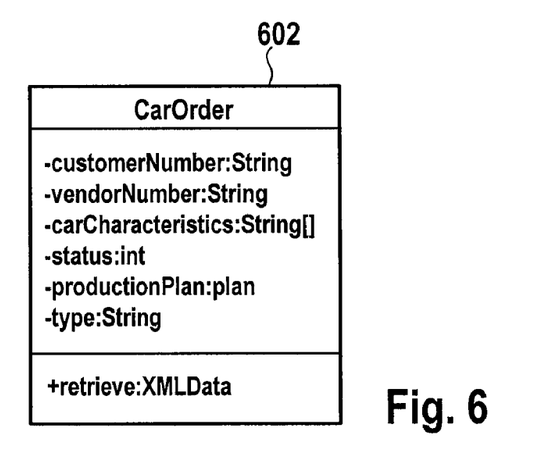
FIG. 6 depicts a second example using role-based access control.
Figure 7:
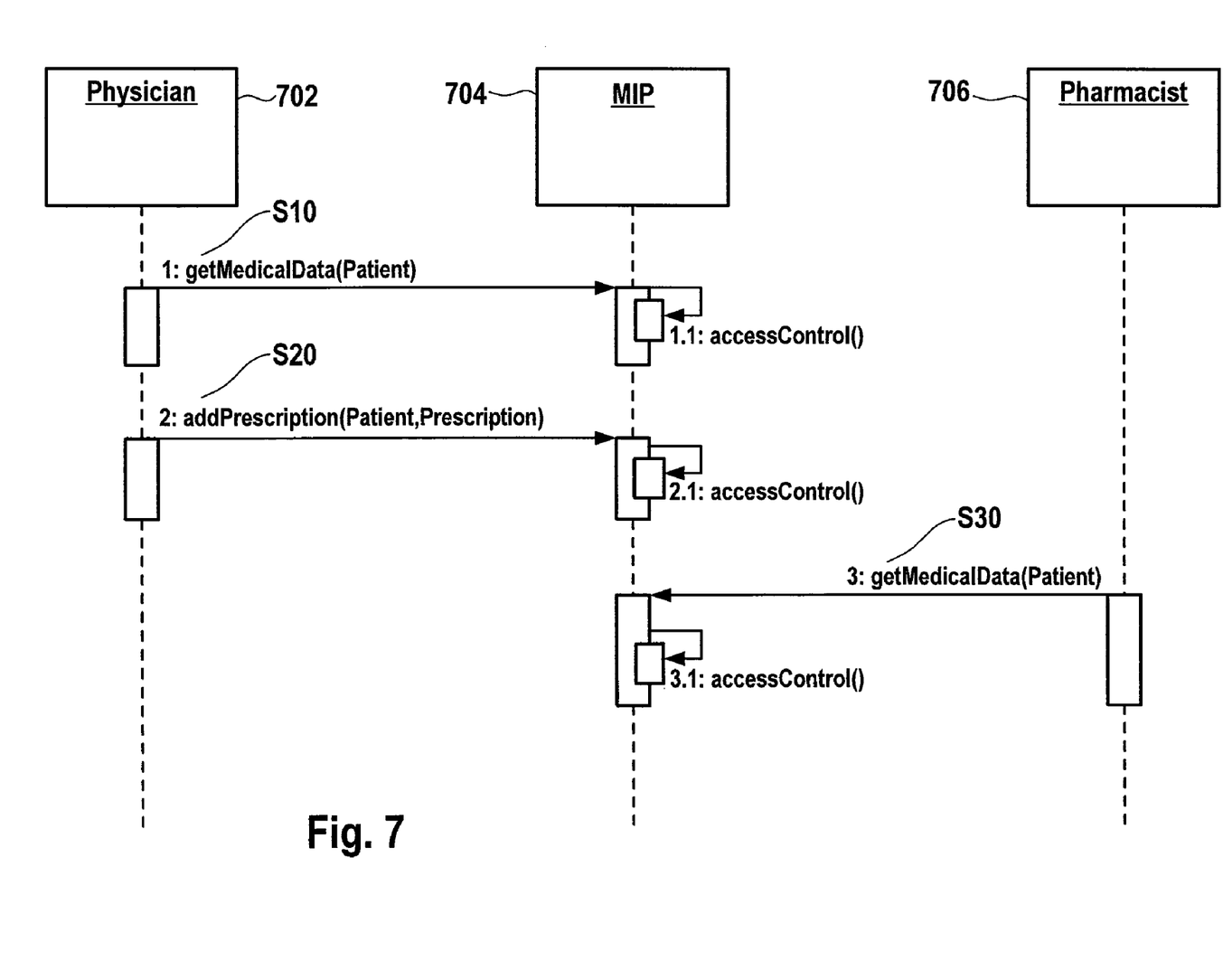
FIG. 7 depicts a sequence diagram of an interaction between a service and a context-aware policy using context-aware access control according to an example embodiment.
Figure 7A:
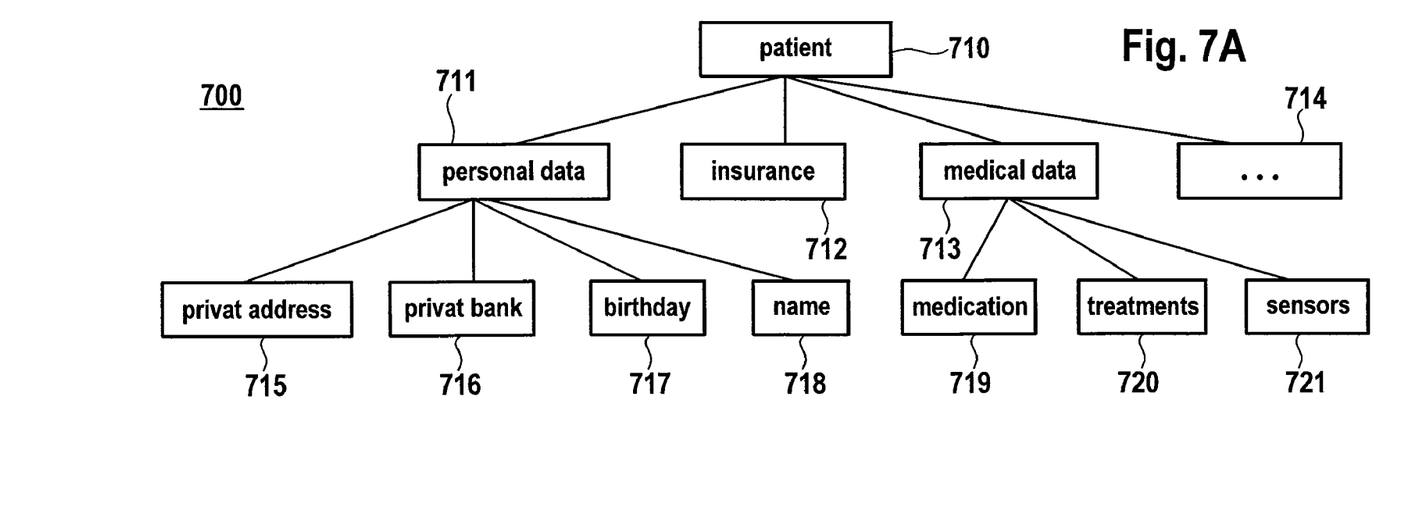
FIG. 7A depicts a resource hierarchy according to an example embodiment.

According to FIGS. 5 to 7 three examples of using a resource hierarchy defined in a single resource and a policy defining unified and identical access control to one or more resources of the resource hierarchy using role-based access control and context-aware access control, respectively are shown. FIG. 5A shows a first example resource hierarchy (500) which may be accessed from an application 10 through a service interface 20 using RBAC and/or context-aware access control. FIG. 7A shows a second example resource hierarchy (700) which may be accessed from an application 10 through a service interface 20 using RBAC and/or context-aware access control. FIGS. 5 and 6 show first and second example abstract resource classes 502 and 602, which may be provided as an interface through the service 20 in order to uniformly access data from different resources (510, 530, 550). FIG. 7 shows a first example using a resource hierarchy (700) which may be accessed from an application 10 through a service interface 20 using context-aware access control.

FIG. 5A refers to an example resource hierarchy 500 for a business application, which may be accessed through an interface 502 provided by the service 20 as shown in FIG. 5.

The resource hierarchy 500 for an employee resource 510 may include one or more resource classes 511 to 521. According to an example embodiment, a resource class 511 to 521 in a resource hierarchy 500 represents a resource. The resource hierarchy 500 may keep the relationships between the resources 511 to 512 comprised. For example, the resource hierarchy 500 for the employee resource 510 may include a resource of personal data (of employees) 512, which may be related to resources of private address, private bank, and birthday 516 to 518 data (of the employee). Accordingly, a single policy may be defined including access control rules to any of the resources 511 to 521 in the resource hierarchy 500.

A single policy may be defined for the resource hierarchy 500 including one or more access control rules. The policy may be applicable to any elements of any resource class 511 to 521 of the resource hierarchy 500. An access control rule of the single policy may take advantage of one or more relationships of the one or more resources in the resource hierarchy, for example by defining a single condition which may apply to one or more elements of one or more of the one or more resources.

The service interface 20 may include an abstract resource class 502 (e.g., BusinessPartner) providing data elements including, for example a name, a birthday, an address and a bank account and operations and/or functions to be performed on the data elements of different roles of resource objects such as business partners such as customers and suppliers. Each of the resource objects may be represented by a resource hierarchy which may be accessed by a client application. For example, an employee resource object 510 may be represented by the resource hierarchy 500 shown in FIG. 5A including different resources for employees. According to an example embodiment, the abstract class 502 may provide an abstract description to create, modify, and/or delete objects. One or more objects may implement different projects of the abstract class 502, each of them adding specific data elements that are only relevant for a specific object. According to an example embodiment, abstract class 502 may be implemented by one or more business partner objects 510 to 550 such as Employee, Customer, and Supplier. Each of the one or more business partner objects 510 to 550 may add specific data elements to the general data elements of the abstract class 502, for example, Employee 510 may include a salary grade, Customer 530 may include marketing data and Supplier 550 may include an invoice address.

The one or more business objects 510 to 550 implementing the abstract class 502 by defining additional and/or opposite data elements and/or operations and/or functions corresponding to one or more projections of the abstract class 502.

According to an example embodiment, the abstract class 502 may be exposed via a service interface 20 and may be used by a client application. Accordingly, the abstract class 502 may provide a unique interface to manipulate and access the one or more resource objects 510 to 550 such that the service interface 20 does not need to change in case of changes of the one or more resource objects 510 to 550.

According to an example embodiment, a policy may be defined to be applied to one or more resource objects. The policy may be provided outside the service, which may provide access to a resource hierarchy 500 of each of the resource objects 510, 530, 550.

According to an example embodiment, a policy may be defined on the resource hierarchy 500 for the employee resource object 510 including the following access control rules, which may be only applied to the retrieve method of the employee resource object 510:

"Only a human resource accountant can access all data of an employee."

"A manager has access to the data of its employees, except for the sensitive personal data, like birthday, private address and private bank account."

"An employee has access to the business address of all other employees and to his own private address and bank account. He has no access to his salary information."

If the resources Employee 510, Customer 530, and Supplier 550 are accessed by another client application, it might be possible, that other policies may be applied.

FIG. 6 refers to an example service interface 20 specifying resources to be accessed from an automated product line producing automobiles. In case a customer orders an automobile, it may be assembled accordingly on demand.

According to an example embodiment, a service interface may provide information about automobiles currently produced through an abstract class 602 such as CarOrder. The abstract class 602 may be accessed from one or more client applications (e.g., customers, mechanics, car vendors, and car companies) using the following policy:

"A customer can only see the status of his ordered cars (all cars related to his customer number). He can access only the general status of the orders that are currently processed or were finished in the last year and he can review all the characteristics of the car."

"A car vendor can see the status of all cars that are ordered via his office and related to all his customers (all cars related to his vendor number which are currently assembled). He can see the same data as a customer and additionally details about the production plan."

"A controller in the car company can access all data."

In case no resource hierarchy is defined for the one or more client applications, it may not be possible to enforce the policy defined above with common RBAC without changing the abstract class 602 of the service interface. In particular, an enforcement process may take into account a role, one or more time constraints, and a dependency of the one or more client applications.

According to an example embodiment, a resource hierarchy according to one or more properties of the one or more client applications may be defined. Access control may then be enforced using the policy given above to one or more objects of the abstract class 602 without changing and/or extending the abstract class 602 of the service interface.

FIG. 7 shows an example interaction using context-aware access control between a service such as a Medical Information Portal (MIP) web service 704 and one or more client applications 702 and 706 such as a physician 702 and a pharmacist 706, wherein the service 704 may provide a unique interface for access of the data from each of the one or more client applications.

According to an example embodiment, the service 704 may provide access to medical data of at least one patient 710, which may include personal data 711, insurance data 712, medical data 713, medication history and prescriptions 719, treatments 720, and/or sensor data 721 having a history, of at least one patient monitored and/or captured by one or more health sensors such as a heart rate sensor and a blood pressure sensor. A monitoring application may monitor the medical data and in case of irregularities either a physician may be contacted for a house call or an emergency alert may be raised.

According to an example embodiment, a first client application 702 such as a physician may need access to the medical data of the patient, i.e., to the resource hierarchy for the patient 700 in case of contact for a house call (S10). Since the medical data may be protected by means of a context-aware access control mechanism, a statement "house call" may be evaluated using context information extracted from one or more health sensors and a proximity may be evaluated from a physical distance between the physician and the at least one patient using GPS data. Accordingly, the first client application 702 may get access only if one or more conditions are fulfilled, for example those defined in Table II as shown below.

TABLE II

| Family Doctor (context information) | Emergency (context information) | House call (context information) | Proximity (context information) | Personal Data | Insurance Data | Sensor Data | Treatments | Medication |
|---|---|---|---|---|---|---|---|---|
| Yes | — | — | — | Yes | Yes | Yes | Yes | Yes |
| No | Yes | — | Far | Yes | No | No | No | No |
| No | Yes | — | Near | Yes | Yes | Yes | No | Yes |
| No | No | Yes | Far | Yes | No | No | No | No |
| No | No | Yes | Near | Yes | Yes | Yes | Yes | Yes |

According to an example embodiment, the first client application 702 may decide to make a prescription for the patient (S20). Accordingly, the service 704 may apply the following access control rule of a policy to the first client application 702 in view of the medical data of the patient:

"A physician can make a prescription for a patient when he is close to the patient."

Accordingly, a second client application 706 such as a pharmacist, which may be assigned to the patient, may be informed by the service 704. In order to properly process the prescription, the second client application 706 may need access to the prescription and to medication history to avoid incompatibilities of drugs consumed by the patient (S30). Accordingly, the following access control rule of the policy may be applied:

"A pharmacist can access the medication and insurance data of a patient, when there is an unprocessed prescription for the patient."

The access control rule of the policy may be enforced in view of the context information example shown in Table III below.

TABLE III

| Unprocessed prescription (context information) | Personal Data | Insurance Data | Sensor Data | Treatments | Medication |
|---|---|---|---|---|---|
| No | No | No | No | No | No |
| Yes | No | Yes | No | No | Yes |

Accordingly, since the resources for the medical data of the patient may be defined in a resource hierarchy 700, which is aware of one or more relationships and/or dependencies among the medical data and since the access control rules are defined in a single policy for the resource hierarchy 700, the service 706 may be accessed from the first and the second application 702 and 706 uniquely and identical using on single interface provided by the service 704 for access to the medical data of the patient. According to the example as described above and as shown in FIG. 7, the first application 702 and the second application 706 may use the same method S10 and S30 to access medical data of the patient, although different access control rules and/or context information may be applied.

Figure 8:
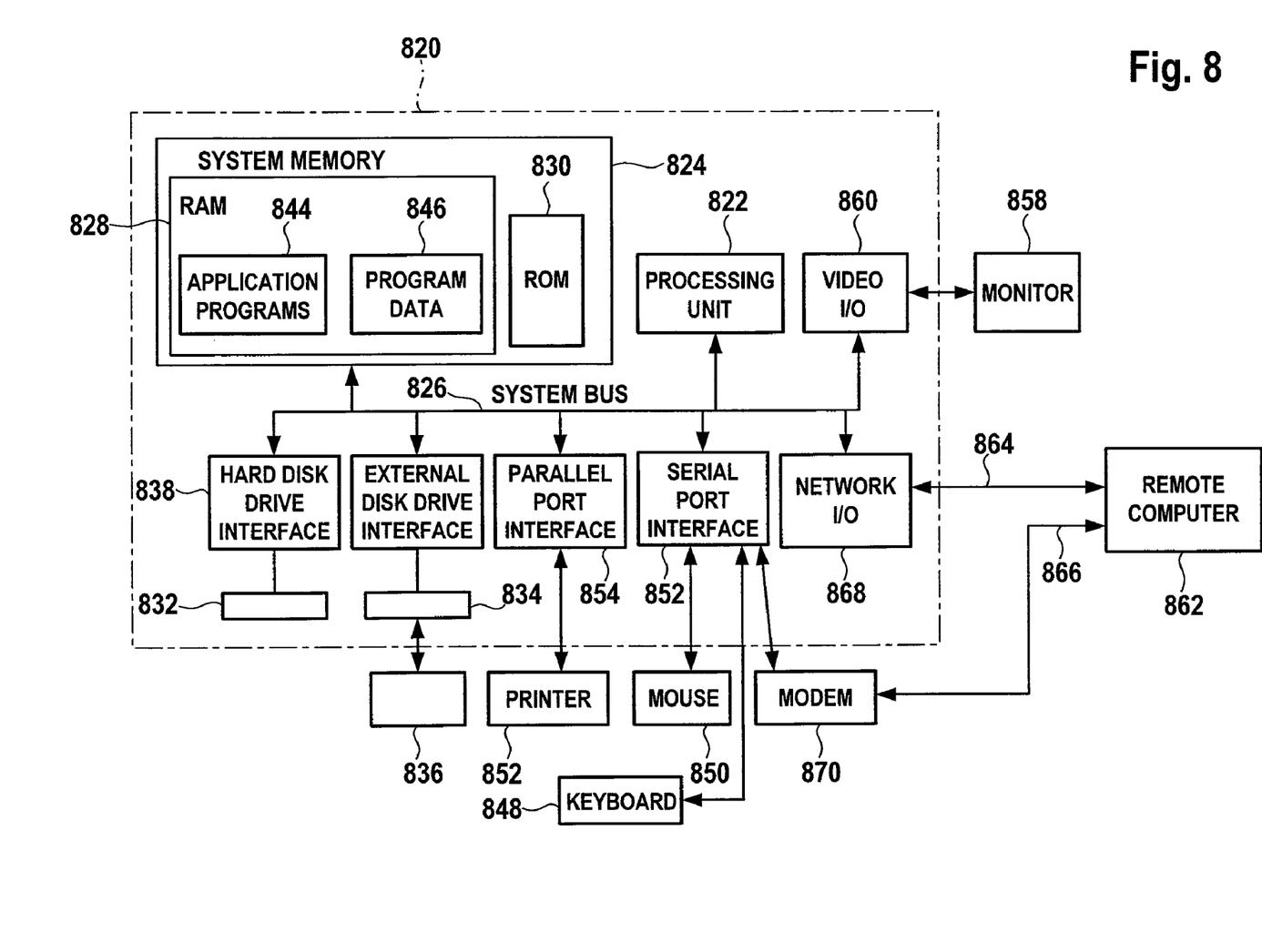
FIG. 8 is a block diagram of a computer architecture according to an example embodiment.

With reference to FIG. 8, an example system for implementing the invention may include a general purpose computing device in the form of a conventional computing environment 820 (e.g., personal computer), including a processing unit 822, a system memory 824, and a system bus 826, that couples various system components including the system memory 824 to the processing unit 822. The processing unit 822 may perform arithmetic, logic and/or control operations by accessing system memory 824. The system memory 824 may store information and/or instructions for use in combination with processing unit 822. The system memory 824 may include volatile and non-volatile memory, such as random access memory (RAM) 828 and read only memory (ROM) 830. A basic input/output system (BIOS) containing the basic routines that helps to transfer information between elements within the personal computer 820, such as during start-up, may be stored in ROM 830. The system bus 826 may be any of several types of bus structures including a memory bus or memory controller, a peripheral bus, and a local bus using any of a variety of bus architectures.

The personal computer 820 may further include a hard disk drive 832 for reading from and writing to a hard disk (not shown), and an external disk drive 834 for reading from or writing to a removable disk 836. The removable disk may be a magnetic disk for a magnetic disk driver or an optical disk such as a CD ROM for an optical disk drive. The hard disk drive 834 and external disk drive 834 are connected to the system bus 826 by a hard disk drive interface 838 and an external disk drive interface 840, respectively. The drives and their associated computer-readable media provide nonvolatile storage of computer readable instructions, data structures, program modules and other data for the personal computer 820. The data structures may include relevant data of the implementation of the method for access control, as described in more detail above and below. The relevant data may be organized in a database, for example a relational or object database.

Although the example environment described herein employs a hard disk (not shown) and an external disk 842, it should be appreciated by those skilled in the art that other types of computer readable media which can store data that is accessible by a computer, such as magnetic cassettes, flash memory cards, digital video disks, random access memories, read only memories, and the like, may also be used in the example operating environment.

A number of program modules may be stored on the hard disk, external disk 842, ROM 830 or RAM 828, including an operating system (not shown), one or more application programs 844, other program modules (not shown), and program data 846. The application programs may include at least a part of the functionality as detailed in FIGS. 1 to 7.

A user may enter commands and information, as discussed below, into the personal computer 820 through input devices such as keyboard 848 and mouse 850. Other input devices (not shown) may include a microphone (or other sensors), joystick, game pad, scanner, or the like. These and other input devices may be connected to the processing unit 822 through a serial port interface 852 that is coupled to the system bus 826, or may be collected by other interfaces, such as a parallel port interface 854, game port or a universal serial bus (USB). Further, information may be printed using printer 856. The printer 856, and other parallel input/output devices may be connected to the processing unit 822 through parallel port interface 854. A monitor 858 or other type of display device is also connected to the system bus 826 via an interface, such as a video input/output 860. In addition to the monitor, computing environment 820 may include other peripheral output devices (not shown), such as speakers or other audible output.

The computing environment 820 may communicate with other electronic devices such as a computer, telephone (wired or wireless), personal digital assistant, television, or the like. To communicate, the computer environment 820 may operate in a networked environment using connections to one or more electronic devices. FIG. 8 depicts the computer environment networked with remote computer 862. The remote computer 862 may be another computing environment such as a server, a router, a network PC, a peer device or other common network node, and may include many or all of the elements described above relative to the computing environment 820. The logical connections depicted in FIG. 8 include a local area network (LAN) 864 and a wide area network (WAN) 866. Such networking environments are commonplace in offices, enterprise-wide computer networks, intranets and the Internet.

When used in a LAN networking environment, the computing environment 820 may be connected to the LAN 864 through a network I/O 868. When used in a WAN networking environment, the computing environment 820 may include a modem 870 or other means for establishing communications over the WAN 866. The modem 870, which may be internal or external to computing environment 820, is connected to the system bus 826 via the serial port interface 852. In a networked environment, program modules depicted relative to the computing environment 820, or portions thereof, may be stored in a remote memory storage device resident on or accessible to remote computer 862. Furthermore other data relevant to the techniques discussed herein may be resident on or accessible via the remote computer 862. Data may be stored for example in an object or a relational database. It will be appreciated that the network connections shown are only examples, and other means of establishing a communications link between the electronic devices may be used.

The above-described computing system is only one example of the type of computing system that may be used to implement the method, system, and computer program product for access control according to the claims.

A number of examples and implementations have been described. Other examples and implementations may, in particular, comprise one or more of the above features. Nevertheless, it will be understood that various modifications may be made. Accordingly, other implementations are within the scope of the following claims.

FIG. 2 is a flowchart illustrating example operations of the system of FIG. 1.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

With reference to other access control techniques, WO 00/79434 A1 refers to a scaleable access filter that is used together with others like it in a virtual private network to control access by users at clients in the network to information resources provided by servers in the network. Each access filter uses a local copy of an access control database to determine whether an access request is made by a user. Each user belongs to one or more user groups and each information resource belongs to one or more information sets.

With reference to another access control technique, Yao Hang-bing, et al., "Dynamic Role and Context-Based Access Control for Grid Applications", TENCON 2005, November 2005, refers to effective access control models for Grid applications. An access control scheme is presented that proposes a dynamic role and context-based access control (RCBAC) framework which extends RBAC with context constraints.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method including executing, using at least one processor, instructions recorded on a non-transitory computer-readable storages medium, the method comprising:
    receiving, using the at least one processor, at least one access request to one or more resources from an application;
    providing, using the at least one processor, a resource hierarchy for the one or more resources, the resources having at least one resource class, wherein the resource hierarchy is defined in a single resource and the resource hierarchy defines one or more relationships among the one or more resources;
    providing, using the at least one processor, a policy comprising at least one access control rule for accessing at least one element of the at least one resource class;
    verifying, using the at least one processor, the at least one access request based on the policy through an authorization service; and
    processing, using the at least one processor, the at least one access request through a service interface.

2. The computer-implemented method of claim 1 wherein the resource hierarchy is provided outside said application and/or said service interface.

3. The computer-implemented method of claim 1 wherein the policy is provided outside said service interface and/or said application.

4. The computer-implemented method of claim 1 wherein the resource hierarchy keeps at least one relationship between the at least one resource class and at least one further resource class.

5. The computer-implemented method of claim 1 wherein an abstract resource class provides an abstraction of the one or more resources through the service interface.

6. The computer-implemented method of claim 5 wherein the one or more resources offer at least one projection of the abstract resource class.

7. The computer-implemented method of claim 1 further comprising:
    receiving, using the at least one processor, first context information from a first information provider; and
    adding, using the at least one processor, said first context information to the at least one access request.

8. The computer-implemented method of claim 7 further comprising:
    retrieving, using the at least one processor, second context information from a second information provider depending on the policy.

9. The computer-implemented method of claim 8 wherein:
    verifying the access request further comprises enforcing, using the at least one processor, the policy with said second context information.

10. The computer-implemented method of claim 1 further comprising:
    sending, using the at least one processor, at least one response for the at least one access request to the application.

11. The computer-implemented method of claim 1 further comprising:
    sending, using the at least one processor, at least one response for the at least one access request to the application based on applying a response filter to the at least one response.

12. The computer-implemented method of claim 1 wherein:
    the policy includes an eXtensible Access Control Markup Language (XACML) policy.

13. A computer system comprising:
    at least one processor;
    a non-transitory computer-readable storage medium including instructions executable by
    the at least one processor, the instructions configured to implement:
    an application configured to send at least one access request to one or more resources;
    a resource hierarchy for the one or more resources, the resources having at least one resource class, wherein the resource hierarchy is defined in a single resource and the resource hierarchy defines one or more relationships among the one or more resources;
    a policy comprising at least one access control rule configured to access at least one element of the at least one resource class;
    an authorization service configured to verify the access request based on the policy; and
    a service interface configured to process the at least one access request.

14. The computer system of claim 13 wherein the resource hierarchy is provided outside said application and/or said service interface.

15. The computer system of claim 13 wherein the policy is provided outside said service interface and/or said application.

16. The computer system of claim 13 wherein the resource hierarchy is configured to keep at least one relationship between the at least one resource class and at least one further resource class.

17. The computer system of claim 13 further comprising an abstract resource class configured to provide an abstraction of the one or more resources through the service interface.

18. The computer system of claim 17 wherein the one or more resources are configured to offer at least one projection of the abstract resource class.

19. A computer program product for handling transaction information, the computer program product being tangibly embodied on a non-transitory computer-readable medium and including executable code that, when executed, is configured to cause a data processing apparatus to:

receive at least one access request to one or more resources from an application;

provide a resource hierarchy for the one or more resources, the resources having at least one resource class, wherein the resource hierarchy is defined in a single resource and the resource hierarchy defines one or more relationships among the one or more resources;

provide a policy comprising at least one access control rule for accessing at least one element of the at least one resource class;

verify the at least one access request based on the policy through an authorization service; and process the at least one access request through a service interface.

20. The computer program product of claim 19 wherein the executable code, when executed, is further configured to cause the data processing apparatus to send at least one response for the at least one access request to the application based on applying a response filter to the at least one response.

* * * * *